US008589326B2

(12) United States Patent  
Balasaygun et al.

(10) Patent No.: US 8,589,326 B2  
(45) Date of Patent: Nov. 19, 2013

(54) UTILIZING PRESENCE IN CONJUNCTION WITH OTHER INFORMATION TO DETERMINE AN APPROPRIATE COMMUNICATIONS MODALITY

(75) Inventors: Mehmet C. Balasaygun, Freehold, NJ (US); Michael J. Killian, Toms River, NJ (US)

(73) Assignee: Avaya Inc., Basking Ridge, NJ (US)

( * ) Notice: Subject to any disclaimer, the term of this patent is extended or adjusted under 35 U.S.C. 154(b) by 266 days.

(21) Appl. No.: 12/829,620

(22) Filed: Jul. 2, 2010

(65) Prior Publication Data

US 2011/0047116 A1 Feb. 24, 2011

Related U.S. Application Data

(60) Provisional application No. 61/235,838, filed on Aug. 21, 2009.

(51) Int. Cl.
| | |
|---|---|
| *G06F 17/00* | (2006.01) |
| *G06N 5/02* | (2006.01) |
| *G06E 1/00* | (2006.01) |
| *G06E 3/00* | (2006.01) |
| *G06F 15/18* | (2006.01) |
| *G06F 7/00* | (2006.01) |
| *G06F 17/30* | (2006.01) |
| *G06G 7/00* | (2006.01) |
| *G06Q 99/00* | (2006.01) |
| *G06Q 10/00* | (2012.01) |

(52) U.S. Cl.
USPC .............. 706/47; 706/21; 705/319; 705/345; 707/776

(58) Field of Classification Search
USPC ................ 706/47, 21; 705/319, 345; 707/776
See application file for complete search history.

(56) References Cited

U.S. PATENT DOCUMENTS 6,157,954 A * 12/2000 Moon et al. .................... 709/228
6,484,130 B2 * 11/2002 Dwyer et al. ................. 702/188
(Continued)

FOREIGN PATENT DOCUMENTS

| CN | 1906605 | 1/2007 |
|---|---|---|
| EP | 1643394 | 4/2006 |

OTHER PUBLICATIONS

Extended Search Report for European Patent Application No. 10172584.4, dated Mar. 20, 2012 9 pages.

(Continued)

*Primary Examiner* — Lut Wong
*Assistant Examiner* — James F Sugent
(74) *Attorney, Agent, or Firm* — Sheridan Ross P.C.

(57) ABSTRACT

Even with SIP and the varied communications options available to users, the monitoring of presence itself may not provide sufficient information to determine a most appropriate contact modality for a communication. Therefore, there is a need for a more complete method of generating a landscape of recent activity from which a preferred communication modality can be determined, with a corresponding solution provided that allows a contactor to contact a contactee via that modality. For example, a network of bearer channels or feeds can be established as input to a presence determination module. The inputs can include not only presence information, but also feeds from one or more blogs, micro blogs, social networking sites, etc., that allow a more complete picture of recent activity to be determined. Based on this input a preferred contact modality can be determined that may enhance the ability of a contactor to contact a contactee.

13 Claims, 3 Drawing Sheets

(56) References Cited

U.S. PATENT DOCUMENTS

| | | | |
|---|---|---|---|
| 7,023,980 B2* | 4/2006 | Lenard | 379/266.07 |
| 8,315,623 B1* | 11/2012 | Flynn et al. | 455/423 |
| 2003/0050977 A1 | 3/2003 | Puthenkulam et al. | |
| 2004/0039630 A1* | 2/2004 | Begole et al. | 705/11 |
| 2005/0226403 A1* | 10/2005 | Lenard | 379/266.07 |
| 2006/0085417 A1* | 4/2006 | John et al. | 707/6 |
| 2007/0127699 A1* | 6/2007 | Lenard | 379/352 |
| 2007/0233730 A1* | 10/2007 | Johnston | 707/104.1 |
| 2007/0293238 A1* | 12/2007 | Fiatal et al. | 455/456.1 |
| 2008/0162637 A1* | 7/2008 | Adamczyk et al. | 709/204 |
| 2009/0177484 A1 | 7/2009 | Davis et al. | |
| 2009/0265327 A1* | 10/2009 | Zou | 707/4 |
| 2010/0149975 A1* | 6/2010 | Tripathi et al. | 370/230.1 |

OTHER PUBLICATIONS

Official Action (English translation) for Chinese Patent Application No. 201010262747.6 dated Jul. 2, 2013, 12 pages.

* cited by examiner

UTILIZING PRESENCE IN CONJUNCTION WITH OTHER INFORMATION TO DETERMINE AN APPROPRIATE COMMUNICATIONS MODALITY

RELATED APPLICATION DATA

This application claims the benefit of and priority under 35 U.S.C. §119(e) to U.S. Patent Application No. 61/235,838, filed Aug. 21, 2009, entitled "MOJO," which is incorporated herein by reference in its entirety.

FIELD

One exemplary aspect is directed toward improving contactability in communications. Even more particularly, an exemplary aspect is directed toward evaluating one or more of blogs, discussion forums, social networking sites, micro blogs, and the like, in an attempt to determine a preferred contact modality to utilize to establish a communication with a contactee. Additionally, an exemplary embodiment can assist with improving the likelihood that the contact that is trying to be reached will actually be available via the chosen modality.

BACKGROUND

The convergence of the mobile telephone network, the static telephone network, and the IP network provides a myriad of communication options for users. If one seeks to contact another individual, he or she may do so by electronic mail or e-mail, instant messaging, wired or wireless telephone, personal computer, pager, personal digital assistant or PDA, and Unified Messaging or UM systems, to name but a few. With so many options, it is difficult, if not impossible, to determine which option at a given point in time will provide the caller with the highest likelihood of contacting the desired individual or callee. Trial and error and guesswork are the typical techniques used to contact the callee, which more often than not leads to a waste of time and frustration on the part of the caller.

Various attempts have been made to provide a presence aware network, which would temporally track an individual's usage of selected communication devices to provide a contactor with the highest likelihood of contacting the individual. Other mechanisms look to that mode a contactee prefers based on presence information such as calendar entries, time of day, etc.

More recently, the Session Initiation Protocol or SIP (which is a simple signaling/application layer protocol for data network multimedia conferencing and telephony) has been developed to provide a degree of presence awareness in a communication network. Although other protocols are equally supportive of presence concepts, SIP provides an illustrative basis for supporting this functionality.

In SIP, systems and proxy servers can provide services such as call forwarding, callee and caller number delivery (where numbers can be any naming scheme such as a conventional URL format), personal mobility (the ability to reach a callee under a single, location-independent address even when the callee changes terminals), terminal-type negotiation and selection (e.g., a caller can be given a choice on how to reach the callee), mobile phone answering service, terminal capability negotiation, caller and callee authentication, blind and supervised call transfer, invitations to multicast conferences, etc.

To provide these varied services, SIP uses a relatively simple message system, namely an "INVITE" message (with the caller's codec preferences) and an "OK" message (with the callee's codec preferences), SIP uses, and various software entities, namely registrars which maintain a map of the addresses of a given user at the current time, proxies which perform call routing, session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online and individual profiles are accessed that specify information for routing based on a number of different criteria.

SUMMARY

Although SIP (Session Initiation Protocol) provides some degree of presence awareness, more presence awareness is desirable. One exemplary problem associated with existing implementations is a notification gap in human communication between live calls and messaging systems.

Existing implementations integrate live-call scenarios on an extremely limited scope. They are generally characterized by static rules for terminating a call at the messaging system or by allowing the messaging system to launch a call. For example, to determine the message waiting status of a mailbox you must either log into the mailbox, or the mailbox must turn on a device-specific message-waiting lamp or other static indicator. Both of these mechanisms exemplify direct, deliberate action on the part of either the user or the system, which is typical of current systems. Current commercial messaging systems allow only primitive dynamic correlation of message notification, presence, and current call context. Even the most advanced workflow engines and collaborative environments in data networks that use more dynamic presence data with mailbox status notification suffer from severe limitations in their scope of communications. They generally cannot interoperate with the public switched telephone network.

Micro blogging is a passive broadcast medium in the form of blogging. A microblog differs from a traditional blog in that its content is typically much smaller, in both actual size and aggregate file size. A microblog entry could include nothing but a short sentence fragment, or an image and/or embedded video. As with traditional blogging, microbloggers post about topics ranging from the simple, such as "what I'm doing right now," to the thematic, such as "dining out." Commercial microblogs also exist, which typically promote websites, services and/or products, and to promote collaboration within an organization.

Some microblogging services offer features such as privacy settings, which allow users to control who can read their microblogs, or alternative ways of publishing entries besides the web-based interface. These may include text messaging, instant messaging, e-mail, or digital audio.

Even with SIP and the varied communications options available to users, the monitoring of presence itself may not provide sufficient information to determine a most appropriate contact modality for a communication. Therefore, there is a need for a more complete method of generating a landscape of recent activity from which a preferred communication modality can be determined, with a corresponding solution provided that allows a contactor to contact a contactee via that modality. For example, a network of bearer channels or feeds can be established as input to a presence determination module. The inputs can include not only presence information, but also feeds from one or more blogs, micro blogs, social networking sites, and the like, that allow a more complete picture of recent activity to be determined by the system. Based on this input information, and optionally one or more rules, a preferred contact modality can be determined that may enhance the ability of a contactor to get in touch with a contactee.

For example, a statistical analysis of use patterns of one or more social networking sites can be weighed in conjunction with presence information to predict what will be the most likely successful communication modality. These usage patterns can be weighed based on usage, frequency of use, most recent use, preference(s) of the contactee, and the like, and can be factored into the statistical analysis.

Additionally, the type of input into the social networking site(s) can be analyzed to assist with the determination. For example, if a user is posting pictures on Facebook®, and their work calendar indicates that they are out of the office, a determination could be made that they are probably on vacation. Therefore, since in this example the contactor is a work colleague, it may preferable to try and contact the contactee via a non-real-time modality so that the contactee can respond at their leisure—perhaps via e-mail.

As another example, if the contactee just tweeted, and it can be seen that the contactee tweets on multiple instances throughout the day, perhaps the most successful contact modality could be through the Twitter® interface—an appropriate interface could then be initiated for the "caller" to allow the communication via the selected contact modality to be sent. As yet another example, pattern matching in various social networking sites could be evaluated to assist in the contact modality determination process. For example, if a user always posts on a certain blog at about 8:15 p.m., there is a good chance that if a contactor trying to reach to a contactee at 8:05 p.m. sends a message to the blog that the contactee will see it.

Information such as last activity, context based analysis, content based analysis, and temporal relationships in one or more social networks and information resources on the Internet can also be factored into the contact modality determination process. Additionally, the number and time of contributions can be considered and contactee-based rules also evaluated when considering an appropriate contact modality.

As another example, one or more of pattern trending, predictive presence determining, conversation analysis, and/or statistical analysis can be used to assist with determining an appropriate contact modality. The result of this contact modality can be used to develop not only an indicator of presence information, such as an icon reflecting predicative presence of a contactee, but also used as the basis to initiate a communication between a contactor and a contactee.

Additional aspects are directed toward an ability to monitor user activity in a plurality of locations, including traditional presence, as well as social networking sites, Internet-based websites or resources, Intranet web-pages or resources, and in general any information from any resource to assist with determining an appropriate contact modality.

Another exemplary aspect is directed toward determining one or more "identities" associated with a contactee, with these identities providing visibility into one or more resources that can be used to further enhance presence determination and predictive presence capabilities. For example, traditional information associated with the user is telephone numbers, e-mail addresses, mobile phone numbers, and the like. Supplementing this information are other identities associated with a contactee such as user ids e.g., handles, nicknames, screen names, author information, and the like.

For example, a user may have numerous screen names associated with numerous websites, such as blogs or social networking sites on which they routinely post information. Similarly, a contactee may have a user name associated with a social networking and/or blogging or micro blogging service that allows the user to exchange information with others. Activities and historical activities associated with a user in conjunction with one or more of these identities can be used to assist with predicting presence, and therefore enhancing a contactor's ability to get in touch with a contactee.

Aspects of the invention are also directed toward analyzing one or more of current and historical information, digesting and analyzing this information, and looking for trends that can further assist with predicting a contactee's behavior. For example, and further to the example above, if a user routinely posts on a handful of social networking sites between 8 and 9 p.m., the user answers personal e-mail during this time, and also occasionally receives telephone calls at a home number, it can be assumed that perhaps it is after dinner, the contactee is relaxing and catching up on personal items, such as hobbies, personal interests, or the like. Therefore, if a contactor attempts to contact the contactee during this time period, the system can provide a recommendation as to one or more preferred contact modalities that are more likely in establishing communication with a contactee—thereby possible reducing the time for the contactee to be aware of the communication and possibly respond.

An additional aspect is directed toward upon the determining of a preferred contact modality for a contactor to communicate with a contactee, the contactor provided with one or more of the appropriate interface, API, web page, or the like, that allows the contactor to establish that communication with the contactee. As an example, if it is determined that the preferred contact modality is via cell phone, the contactor can be provided with the contactee's cell phone number, or in order to obfuscate the cell phone number of the contactee, the call to the contactee is automatically initiated without the contactor having visibility into the contactee's cell number.

In another exemplary embodiment, the contactor could be provided a micro-blogging API that identifies the contactee in the "To:" field. As with the previously discussed embodiment, and in general for all embodiments discussed herein, this "To" type information can be obfuscated from the contactor, for example, based on one or more rules.

Accordingly, an exemplary embodiment is directed toward determining a preferred contact modality.

An additional aspect is directed toward determining a preferred contact modality in accordance with one or more rules, presence information, and additional information resources.

Even further aspects are directed toward monitoring and/or analyzing historical activity on one or more resources, such as blogs, discussion forums, social networking sites, micro-blogs, sites with a dedicated API, or in general any information source, and using this information optionally in conjunction with traditional presence information to predict a preferred contact modality for a contactee.

Additional aspects are directed toward notifying a contactor of a determined preferred contact modality.

Even further aspects are directed toward performing one or more of pattern trending, context analysis, statistical analysis, usage pattern analysis, content analysis, input type analysis, temporal relationship analysis, and history analysis to assist the determining a preferred contact modality.

Even further aspects are directed toward one or more of detecting or requesting from a user one or more identities associated with the user, the identities used, for example, in conjunction with one or more of the blogs, discussion forms, social networking sites, micro-blogs, and the like.

Additional aspects are directed toward, once a preferred contact modality has been established, generating an icon, or other indicator that can be presented to a contactor, the indicator representing the preferred contact modality of the contactee. For example, a telephone icon can be displayed if the preferred contact modality is via telephone, a specific micro-blog logo displayed if the preferred contact modality is a certain commercial micro blog, an envelope presented if the preferred contact modality is via e-mail, and the like.

Aspects are also related to adding time of day/date and/or the location of the contactee. This information can come from social net posts the contactee is making via applications like Foursquare, or, future use of location services that mobile service providers have. This is another factor that can be used in the equation of picking the most appropriate contact method.

These and other advantages will be apparent from the disclosure contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments of the invention will be described in detail, with reference to the following figures, wherein.

DETAILED DESCRIPTION

Some embodiments will be illustrated below in conjunction with an exemplary communication system. Although well suited for use with, e.g., a system using switch(es), server(s) and/or database(s), communications endpoints, etc, the embodiments are not limited to use with any particular type of communication system or configuration of system elements. Those skilled in the art will recognize that the disclosed techniques may be used in any communication application in which it is desirable to provide enhanced contactability.

Figure 1:
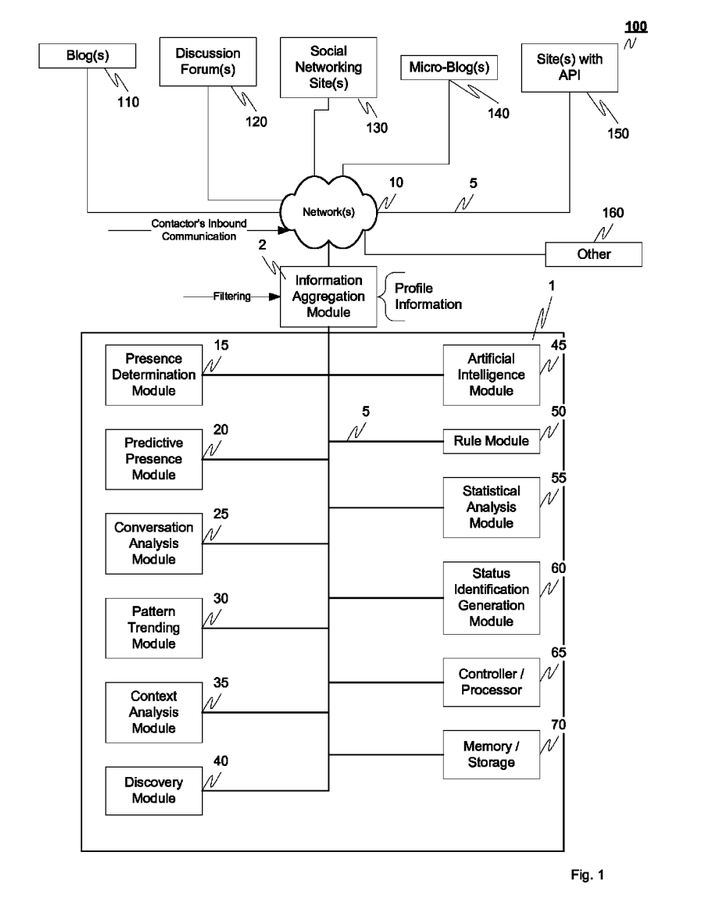
FIG. 1 illustrates an exemplary communications environment.

Referring initially to FIG. 1 an exemplary communication environment 100 will be described in accordance with at least some embodiments. The communication system comprises (in addition to well-known componentry) a communication network connecting a plurality of communication devices, internet information sources and the like.

In one embodiment, communication system may include a switch that may include a private branch exchange (PBX) system or any similar type of switching system capable of providing a telephone service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call participants, servers, and databases. The switching fabric can provide the functionality to direct incoming and/or outgoing calls to various endpoints and further provides for conferencing capabilities between endpoints as well as the ability for forward information associated with presence.

Communication devices associated with the participants may be packet-switched or circuit-switched and can include, for example, IP telephones such as the Avaya Inc.'s, 96xx Series IP Phones™, IP softphones such as Avaya Inc.'s, one-X Communicator™, Personal Digital Assistants or PDAs, Personal Computers or PCs, laptops, netbooks, tablets, packet-based H.320 video phones and conferencing units, packet-based voice messaging and response units, packet-based traditional computer telephony adjuncts, and conventional wired or wireless telephones. Additional devices associated with the participants may be computer-based internet browsers and/or applications specific to a particular communications modality, such as an application (and associated communications hardware) that supports micro-blogging from a computer or mobile computing or communications device.

FIG. 1 illustrates an exemplary communications environment 100. The communications environment 100 includes a contact assistance system 1 connected via one or more networks 10 and links 5, to one or more information sources, such as blogs 110, discussion forums 120, social networking sites 130, micro-blogs 140, sites (such as any of 110-140) with a dedicated API 150, and other information sources, generically represented as other 160, which can, for example, include location information, presence information, and also include time of day/date at the location of the contactee. Also present within the communications environment 100 is an information aggregation module 2 that is connectable to one or more of the contact assistance system 1 and information sources 110-160.

The contact assistance system 1 includes a presence determination module 15, a predictive presence module 20, a conversation analysis module 25, a pattern trending module 30, a context analysis module 35, a discovery module 40, an artificial intelligence module 45, a rule module 50, a statistical analysis module 55, a status identification generation module 60, a processor 65, and memory/storage 70.

To assist with determining a more preferred mode of contacting a specific contactee, contact assistance system 1 should be provided with various pieces of information, or identities, which can assist the system in tracking what a user is actually doing. If, based on profile information, the information aggregation module 2 is aware of all the identities associated with a user, such as handles, nicknames, screen names, author information, telephone numbers, cell phone numbers, email addresses, and in general any information that is used by the user to either communicate and/or receive information; this allows the harvesting of information by aggregation module 2 and the ability to analyze any communications associated with those user ID's. Additionally, and based on one or more of profile information, history information (for example derived from an internet browser) and user activities, various locations where a user posts information (or visits) can also be identified by the information aggregation module 2 to assist with predicting presence, as discussed in greater detail hereinafter.

Assuming that between the profile information and history information, the information aggregation module 2 is aware of all addresses, locations, and other information sources, the various information at these sources is either pulled or pushed, or otherwise assembled or harvested or mined by the information aggregation module 2. The information aggregation module 2 can optionally perform filtering based, for example, on duplicative information, stale information, or the like.

As an alternative, information aggregation module 2 can perform in a proactive nature and look at one or more of caller ID information, network information, history information, browsing information, profile information, and the like, to obtain one or more user ID's associated with each of the information sources. Again, the results of this discovery can be used by the information aggregation module 2 to assist with identifying and monitoring and one or more of the information sources for user (contactor) activity.

As another alternative, or an addition, the user can be queried and requested to input their user ID for one or more of the information sources which can then be used by the information aggregation module 2 as discussed. With the knowledge of the various places a user may post information in conjunction with various activities, the contact assistance system 1 begins using this information to monitor the one or more information resources to facilitate determining a more accurate presence of the user, and thus a more preferred contact modality.

In accordance with one exemplary embodiment, feeds of the various information resources can be established, with the information posted thereto by the user forwarded by the information aggregation module 2 to one or more of the presence determination module 15, artificial intelligence module 45, and storage 70. As discussed, this information can be filtered based on one or more criteria to help the contact assistance system 1 in determining a more accurate presence as well as contactee preferences. As this information is aggregated, one or more portions of the information can be stored in the contact assistance system 1 to facilitate analysis and future presence prediction and/or preference.

More specifically, the information from the various information sources can be analyzed, in conjunction with one or more of the predictive presence module 20, conversation analysis module 25, pattern trending module 30, context analysis module 35, and statistical analysis module 55 to assist with predicting the presence.

Even more specifically, the conversation analysis module 25, optionally in conjunction with the context analysis module 35 and associated content analysis module performed by the artificial intelligence module 45, can analyze various conversations, threads, posts, and/or message exchanges to assist with predicting presence. For example, the content of a conversation (or even a singular post) can be analyzed to look for, for example, key words that may assist with predicting presence. For example, the user indicates they are going to go on vacation, the user indicates they are going to be attending a specific function or meeting, the user indicates they are going to be out of the office, the user indicates they are going to be in a client meeting, or in general any indicator of a future scheduled activity can be used to assist with the predicting of presence. This can be combined with an analysis of calendar information as well.

The pattern trending module 30 can look for patterns or trends in the information from the information sources 110-160 to again assist with predicting presence. For example, regardless of the source of the information, or modality thereof, patterns, such as when posts are made to that information source, when that information source is accessed, and/or the like can be used with all of that information being assessed or trending or pattern recognition being performed. In addition, history information, such as that associated with a web browser, sent emails, posts, and the like, can also be included in the pattern trending analysis by the pattern trending module 30 to build a database of when a user performs certain activities, and where.

In addition, or as an alternative, or in conjunction with the above, usage patterns and analysis, input type analysis, content analysis and temporal relationship analysis can also be combined with the above to facilitate predictive presence. Input type analysis can include, for example, from what type of resource or communications device is the user interacting with the various information sources. As examples, a personal computer, PDA, tablet PC, Smartphone, or the like, can be detected in conjunction with the discovery module 40 to assist with determining how the user is interfacing with the various information resources.

Temporal relationship analysis allows the artificial intelligence module 45 to look at temporal relationships between one or more information sources, resources, entities, persons, or the like to further assist with the predictive presence analysis.

As the contact assistance system 1 begins developing a database that not only provides trending information, but insight into how a particular user interacts with various information sources, such as blogs, discussion forums, social networking sites, micro-blogs, and the like, the statistical analysis module 55 can cooperate with the predictive presence module 20 to assist in predicting a user's future presence based on the statistical analysis. In addition, and in cooperation with the presence determination module 15, traditional presence information can also be included with the analysis performed by the predictive presence module 20, artificial intelligence module 45 and rule module 50 to predict the presence of a user. As will be appreciated, there may be certain instances where this tracking may be optional or opted-in (or opted-out) by the contactee's—for example, the "monitoring" may not be performed without the contactee's permission.

This predicted presence is then used by the predictive presence module 20 to determine a preferred contact modality, upon the contact assistance system 1 being notified that another entity (caller or contactor) is trying to contact the user (contactee). This preferred contact modality can be via any communication system, technique, or protocol associated with the user and understandably may not be limited to a reply, for example, on a discussion forum. Rather, the integration and analysis of information associated with the user from all the disparate sources can be used to assist with predicting presence, which transitions to assessment of what contact modality will be most effective at a particular instance. Overlaying this decision for preferred contact modality can be one or more rules that the user can define that may further stipulate which preferred contact modality is a more preferred contact modality in accordance with the user's preferences. For example, if the user goes on vacation, and even though the preferred contact modality was determined to be contacting the user on a cell phone from a work colleague, the user could implement a rule specifying that in this particular set of circumstances, the user would still rather be contacted via email or private message (PM), instead of phone. Alternatively, or in addition, the system could provide a ranking of the different modalities based on the likelihood of contact on each which could be communicated to the caller.

Accordingly, the user, based on one or more of personal preferences, specialized information or knowledge the user may have, or the like, may establish one or more rules that either override or supplement the determined preferred contact modality as determined by the predictive presence module 20.

Having determined the preferred contact modality, the contact assistor can notify the contactor of the preferred contact modality with, for example, a prediction of how long the preferred contact modality may be valid. As an example, assume a user typically checks a particular social networking site two to three times a week, and their average time of accessing the site is eight minutes—then, if the preferred contact modality is via the contactor sending a message to this particular social networking site, but the user has been logged on for five minutes, the contactor could be notified that the best opportunity is to contact the user within the next three minutes at the particular social networking site.

This notification can be provided to a contactor with the cooperation of the status identification generation module 60. For example, the status identification generation module 60 can generate and return status information, such as a preferred contact modality, via one or more of text, speech, and/or graphically to the contactor when the contactor is determined to be trying to contact the user. Status identification generation module 60 can further interface with traditional presence notification techniques in known ways to provide this enhanced preferred contact modality functionality.

Figure 2:
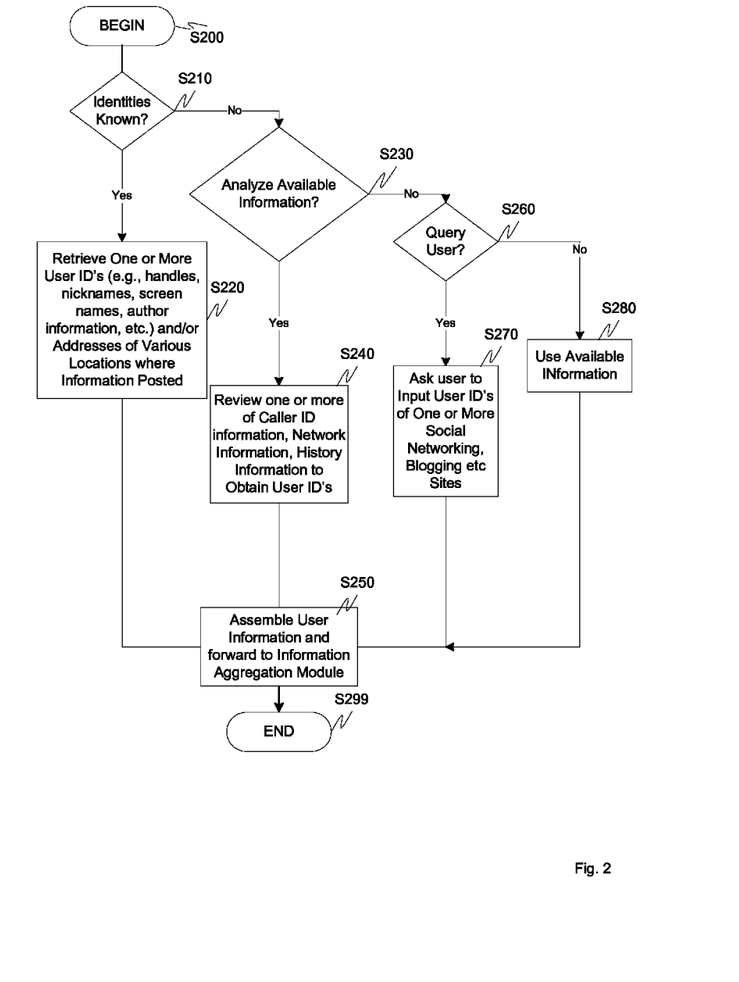
FIG. 2 is a flowchart outlining an exemplary method for assembling user identities.

FIG. 2 is a flowchart outlining an exemplary method of determining information sources with which a user may be associated. In particular, control begins at step S200 and continues to step S210. In step S210, a determination is made whether all the identities of a user are known. If all the identities are known, control continues to step S220 where one or more user ID's, such as handles, nicknames, screen names, author information, caller ID information, telephone numbers, and the like, as well as one or more addresses of various locations where the user posts information, such as a URL, are retrieved. Control then continues to step S250. In step S250, various user ID's are assembled and used as discussed hereinafter for harvesting and aggregating information related to the user. Control then continues to step S299 where the control sequence ends.

If the identities are not known, control jumps to step S230. In step S230, a determination is made whether to analyze available information. If available information is to be analyzed, control continues to step S240 where the system can query one or more of caller ID information, network information, history information, such as browser history information, call log information, email sending and receiving information, or in general any information relating to any communication, and any communication modality, being received from or sent by the user. Control then continues to step S250.

If the system does not analyze available information in step S230, control jumps to step S260 where determination is made whether to query the user for their user ID's. If the system does query the user, control continues to step S270 where the user is asked to input one or more of their user ID's, for the one or more information sources, such as blogs, discussion forums, social networking sites, and the like thereby allowing the tracking of the user's activities at those sites. Otherwise, control continues to step S280 where available information is used to assist with the predictive presence determination.

Figure 3:
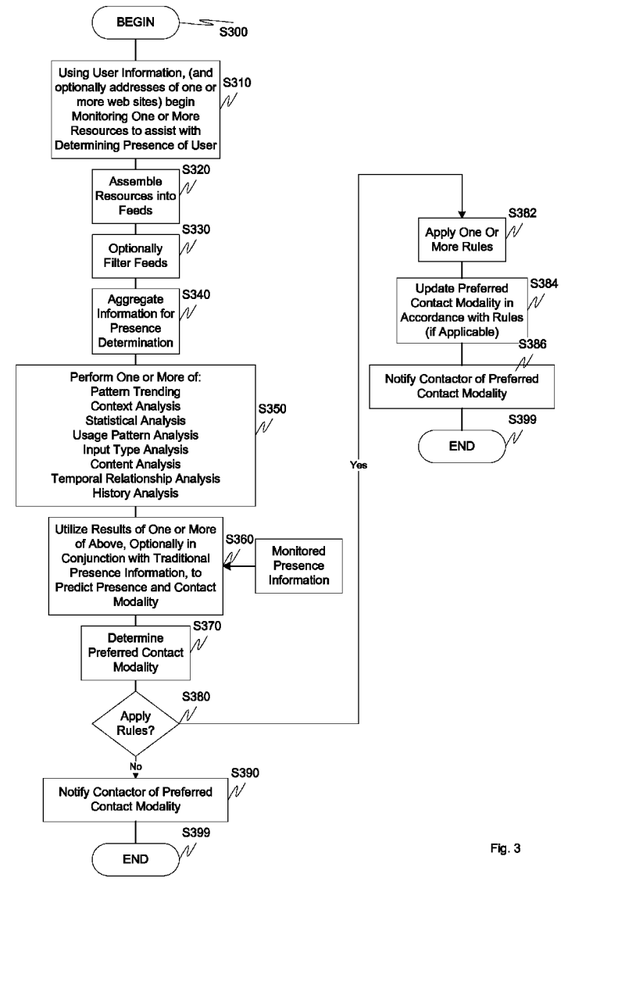
FIG. 3 is a flowchart outlining an exemplary method for determining a preferred contact modality.

FIG. 3 is a flowchart outlining an exemplary method for predicting presence, and therefore a preferred contact modality. In particular, control begins in step S300 and continues to step S310. In step S310, user information, as discussed above, optionally with one or more addresses of websites, social networking sites, or the like, are monitored for user presence therein. In addition, traditional presence monitoring techniques associated with SIP or other communications protocols can also be used. Next, in step S320, and in conjunction with the monitoring of the various information sources, activities at those information sources are monitored and assembled, for example, in one or more feeds that can optionally be filtered in step S330. Then, in step S340, the information is aggregated for presentation to the predictive presence system. Control then continues to step S350.

In step S350, one or more of pattern trending, context analysis, statistical analysis, usage pattern analysis, input type analysis, content analysis, temporal relationship analysis and history analysis is performed on one or more portions of the information received from the various information feeds. Next, in step S360, the results of step S350, optionally in conjunction with traditional presence information, are utilized to predict the presence and, a preferred contact modality. Then, in step S370, this preferred contact modality is determined and stored. Control then continues to step S380.

In step S380, a determination is made as to whether one or more rules apply to the determined preferred contact modality. If one or more rules do apply, control jumps to step S382 with control otherwise continuing to step S390. In step S390, a contactor is notified via one or more of text, speech, and/or graphically of the preferred contact modality for the user, optionally with an indication of how long that preferred contact modality is accurate. Additionally, a plurality of preferred contact modalities can be provided to the contactor with each contact modality being predictive of a preferred contact modality for a certain time period.

For example, a preferred contact modality can be provided to the contactor that provides them with the preferred contact modality, or modalities, that may be relevant for the next two hours. Again, given there may be security implications with this type of implementation, rules can be applied that restrict how granular, detailed, or elaborate these preferred contact modality, or modalities, are based on, for example, the identity of the contactor, which can be determined via caller ID, or in a similar manner. Control then continues to step S399 where the control sequence ends.

In step S382, one or more rules can be applied to the determined preferred contact modality. Next, in step S384, the preferred contact modality can be updated in accordance with one or more rules, if applicable, thereby overriding or supplementing the determined preferred contact modality. Then, in step S386, the contactor is notified of this updated, or rule enhanced or changed, preferred contact modality with control continuing to step S399 where the control sequence ends.

The various embodiments include components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhanced communications. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method to provide improved contactability in a communications environment comprising:

aggregating information, with the cooperation of an information aggregation module, from one or more information sources, wherein the one or more information sources include one or more of a blog, a discussion forum, a social networking site, a micro-blog, and a web site;

performing one or more of a conversation analysis, pattern analysis, context analysis, content analysis, usage pattern analysis, input type analysis, temporal relationship analysis, an analysis of history, and statistical analysis of the aggregated information, wherein the analysis performed includes an analysis of a contact modality of a last communication by a contactee;

predicting one or more preferred contact modalities based on a predicted presence of the contactee, a predicted behavior of the contactee, and a content type, wherein the predicted presence of the contactee is based on an analysis of one or more keywords from conversations or calendar information contained in the aggregated information and wherein the predicted behavior of the contactee is based on known activities of the contactee during certain time periods and wherein the content type comprises a picture;

applying one or more rules that at least one of override and supplement the one or more predicted preferred contact modalities;

updating the one or more predicted preferred contact modalities;

providing the one or more predicted preferred contact modalities to a contactor, the one or more predicted preferred contact modalities being predictive of a preferred contact modality for a specific time period and provided to the contactor based on an identity of the contactor;

providing an icon to the contactor, the icon being representative of the preferred contact modality of the contactee;

providing information regarding one or more of the predicted preferred contact modalities of the contactee to the contactor, the provided information comprising at least a specific time period of how long the one or more predicted preferred contact modalities may be valid; and using one or more of the predicted preferred contact modalities, initiating a communication from the contactor to the contactee.

2. The method of claim 1, further comprising determining one or more user identities associated with a contactee.

3. The method of claim 1, further comprising filtering the aggregated information.

4. The method of claim 1, wherein the one or more preferred contact modalities are filtered based on contactee identification information.

5. A non-transitory computer-readable information storage media having stored thereon instructions, that, if executed by a processor, perform the steps of claim 1.

6. The method of claim 1, wherein the analysis performed includes the usage pattern analysis.

7. The method of claim 1, wherein the one or more predicted preferred contact modalities are based in part on presence information for the contactee, and wherein the one or more predicted preferred contact modalities of the contactee is different than the contact modality of the last communication by the contactee.

8. The method of claim 1, wherein the one or more predicted preferred contact modalities are filtered based on contactee identification information.

9. A system to provide improved contactability in a communications environment comprising:

a processor;

an information aggregation module executed by the processor that aggregates information from one or more information sources, wherein the one or more information sources include one or more of a blog, a discussion forum, a social networking site, a micro-blog, and a web site;

one or more modules that perform one or more of a conversation analysis, pattern analysis, context analysis, content analysis, usage pattern analysis, input type analysis, temporal relationship analysis, an analysis of history, and statistical analysis of the aggregated information, wherein the one or more modules performs an analysis of a contact modality of a last communication by a contactee;

a predictive presence module that predicts one or more preferred contact modalities based on a predicted presence of the contactee, a predicted behavior of the contactee, and a content type and that provides the one or more predicted preferred contact modalities of the contactee to a contactor, the one or more predicted preferred contact modalities being predictive of a preferred contact modality for a specific time period and provided to the contactor based on an identity of the contactor, wherein the predicted presence of the contactee is based on an analysis of one or more keywords from conversations or calendar information contained in the aggregated information, wherein the predicted behavior of the contactee is based on known activities of the contactee during certain time periods, and wherein the content type comprises a picture such that a communication is initiated using at least one of the predicted preferred contact modalities;

a rules module that applies one or more rules that at least one of override and supplement the one or more predicted preferred contact modalities and updates the one or more predicted preferred contact modalities; and a status identification module that provides information regarding one or more of the predicted preferred contact modalities of the contactee to the contactor, the information comprising at least a specific time period of how long the one or more predicted preferred contact modalities may be valid and an icon representative of the preferred contact modality of the contactee.

10. The system of claim 9, further comprising a discovery module that determines one or more user identities associated with a contactee.

11. The system of claim 9, wherein the aggregated information is filtered.

12. The system of claim 9, further comprising a presence determination module that determines a contactee's presence.

13. The system of claim 9, further comprising an artificial intelligence module that analyses one or more conversations, posts, threads and message exchanges.

\* \* \* \* \*